(12) United States Patent
Döring et al.

(10) Patent No.: US 7,937,933 B2
(45) Date of Patent: *May 10, 2011

(54) EXHAUST GAS POST TREATMENT SYSTEM

(75) Inventors: Andreas Döring, München (DE); Peter Spaniol, Zirndorf (DE)

(73) Assignee: MAN Truck & Bus AG (DE)

( * ) Notice: Subject to any disclaimer, the term of this patent is extended or adjusted under 35 U.S.C. 154(b) by 840 days.

This patent is subject to a terminal disclaimer.

(21) Appl. No.: 11/840,081

(22) Filed: Aug. 16, 2007

(65) Prior Publication Data

US 2008/0041053 A1 Feb. 21, 2008

(30) Foreign Application Priority Data

Aug. 16, 2006 (DE) .......................... 10 2006 038 290

(51) Int. Cl.
*F01N 3/00* (2006.01)
(52) U.S. Cl. ............... 60/286; 60/274; 60/288; 60/295; 60/301; 60/303
(58) Field of Classification Search ............... 60/274, 60/280, 286, 287, 288, 292, 295, 297, 299, 60/301, 303, 311, 324
See application file for complete search history.

(56) References Cited

U.S. PATENT DOCUMENTS

| | | | | |
|---|---|---|---|---|
| 6,718,757 B2 * | 4/2004 | Khair et al. | | 60/286 |
| 6,892,529 B2 * | 5/2005 | Duvinage et al. | | 60/286 |
| 7,040,087 B2 * | 5/2006 | Nakatani et al. | | 60/286 |
| 7,093,428 B2 * | 8/2006 | LaBarge et al. | | 60/286 |
| 7,229,597 B2 | 6/2007 | Patchett et al. | | |
| 7,402,292 B2 * | 7/2008 | Hemingway et al. | | 423/239.1 |
| 7,434,387 B2 * | 10/2008 | Yan | | 60/286 |
| 7,610,750 B2 * | 11/2009 | Viola et al. | | 60/286 |
| 7,614,214 B2 * | 11/2009 | Yan | | 60/286 |
| 7,614,218 B2 * | 11/2009 | Akagawa | | 60/295 |
| 7,802,419 B2 * | 9/2010 | Doring | | 60/286 |

FOREIGN PATENT DOCUMENTS

EP 1 357 267 10/2003
WO WO 2006/029201 3/2006

* cited by examiner

*Primary Examiner* — Binh Q Tran
(74) *Attorney, Agent, or Firm* — Robert W. Becker; Robert W. Becker & Assoc.

(57) ABSTRACT

Exhaust gas post treatment system for nitrogen oxide and particle reduction of an internal combustion engines operated with excess air. An oxidation catalytic converter is disposed in the exhaust gas stream of the engine for converting at least a portion of the nitric oxide of the exhaust gas into nitrogen dioxide. A metering device adds reduction agent to the exhaust gas stream downstream of the oxidation catalytic converter and/or to a partial exhaust gas stream branched off upstream of the oxidation catalytic converter and returned to the exhaust gas stream downstream thereof. The reduction agent is ammonia or a material that releases ammonia downstream of the supply location due to the hot exhaust gas. A particle separator or filter is disposed in the exhaust gas stream downstream of the oxidation catalytic converter and of the supply location, and converts carbon particles accumulated in the separator or filter into carbon monoxide, carbon dioxide, nitrogen and nitric oxide with the aid of nitrogen dioxide in the exhaust gas stream. An SCR catalytic converter is disposed downstream of the separator or filter for reducing nitrogen oxides in the exhaust gas stream into nitrogen and water vapor with the aid of ammonia or released ammonia by selective catalytic reduction.

19 Claims, 2 Drawing Sheets

EXHAUST GAS POST TREATMENT SYSTEM

The instant application should be granted the priority date of 16 Aug. 2006 the filing date of the corresponding German patent application DE 10 2006 038 290.0.

BACKGROUND OF THE INVENTION

The present invention relates to an exhaust gas post treatment system for internal combustion engines, such as diesel engines and gasoline engines having direct injection, that are operated with excess air.

Limited exhaust gas components, which result during combustion processes and the permissible emissions of which are continuously being lowered, include, in addition to solid particles, nitrogen oxides. To minimize these exhaust gas components with internal combustion engines operated in motor vehicles, various methods are presently used. The reduction of the nitrogen oxides generally occurs with the aid of catalysts, and in oxygen-rich exhaust gas a reduction agent is additionally required in order to increase the selectivity and $NO_x$ conversions. These methods have become know by the collective term SCR processes, whereby SCR stands for "Selective Catalytic Reduction". It has been used for many years in the power plant industry, and in recent times also with internal combustion engines. A detailed illustration of such processes can be found in DE 34 28 232 A1. $V_2O_5$-containing mixed oxides, for example in the form of $V_2O_5/WO_3/TiO_2$, can be used as SCR catalysts. Typical $V_2O_5$ proportions are between 0.2-3%. In practice ammonia, or compounds that release ammonia, such as urea or ammonium formate, in solid or dissolved form, are used as reduction agents. To convert one mol nitric oxide one mol ammonia is required.

$$4NO + 4NH_3 + O_2 \rightarrow 4N_2 + 6H_2O \tag{1}$$

If a platinum-containing NO-oxidation catalytic converter is disposed upstream of the SCR catalyst for the formation of $NO_2$ $$2NO + O_2 \leftrightarrow 2NO_2 \tag{2}$$

The SCR reaction can be considerably accelerated, and the low temperature activity can be significantly raised.

$$NO + 2NH_3 + NO_2 \rightarrow 2N_2 + 3H_2O \tag{3}$$

With internal combustion engines operated in vehicles the nitrogen oxide reduction with the aid of the SCR process is difficult for the reason that changing operating conditions exist that make the quantitative metering of the reduction agent difficult. Although on the one hand as high a conversion of the nitrogen oxides as possible should be achieved, on the other hand care must be taken that there is no emission of unused ammonia. To provide a remedial measure, an ammonia-blocking catalytic converter is frequently disposed downstream of the SCR catalyst to convert excess ammonia into nitrogen and water vapor. The use of $V_2O_5$ as active material for the SCR catalyst can also pose a problem if the exhaust gas temperature at the SCR catalyst is greater than 650° C., because $V_2O_5$ then sublimates. For this reason, iron or copper zeolites that are free of $V_2O_5$ are used for high temperature applications.

To minimize the very fine particles, not only in the power plant industry but also with vehicles, either so-called particle separators or particle filters are used. A typical arrangement having particle separators for use in vehicles is described, for example, in EP 1 072 765 A1. Such arrangements differ from those having particle filters in that the diameter of the channels of the particle separator are considerably greater than the diameter of the largest particle that is present, whereas with particle filters the diameter of the filter channels is in the range of the diameter of the particles. As a consequence of this difference, particle filters are subject to becoming clogged, which increases the exhaust gas counter pressure and reduces the engine power. An arrangement and a method using particle filters can be found in EP 0 341 832 A2. The two aforementioned arrangements or methods are characterized in that the oxidation catalytic converter, which is respectively disposed upstream of the particle separator or particle filter, and which is generally a catalyst having platinum as the active material, oxidizes the nitric oxide in the exhaust gas with the aid of the also-contained residual oxygen to nitrogen dioxide, which in turn is converted in the particle separator, or the particle filter, with the carbon particles to CO, $CO_2$, $N_2$, and NO. In this way, a continuous removal of the accumulated very fine particles is effected; expensive and/or complicated regeneration cycles, which must be carried out with other arrangements, are thereby eliminated.

$$2NO_2 + C \rightarrow 2NO + CO_2 \tag{4}$$

$$2NO_2 + C = 2NO + CO \tag{5}$$

$$2C + 2NO_2 \rightarrow N_2 + 2CO_2 \tag{6}$$

In order to fulfill the exhaust gas regulations that will be applicable in the future, it is necessary to simultaneously use not only arrangements for reducing nitrogen oxide emissions, but also arrangements for reducing the emission of very fine particles. For this purpose, already various arrangements and methods have become known.

DE 103 48 799 A1 describes an arrangement that is comprised of an oxidation catalytic converter, an SCR catalyst disposed downstream thereof in the exhaust gas stream, and a particle filter that in turn is disposed downstream of the SCR catalyst in the exhaust gas stream. The supply of the reduction agent for the selective catalytic reaction that takes place in the SCR catalyst is effected immediately prior to the SCR catalyst via a urea injection device that is controlled as a function of operating parameters of the internal combustion engine. The drawback of this arrangement is that the nitrogen dioxide produced in the oxidation catalytic converter is essentially completely used up by the selective catalytic reduction in the SCR catalyst, in other words, is no longer available for the conversion of the very fine particles that have accumulated in the downstream particle filter. The regeneration of the particle filter must therefore be realized by an expensive and/or cyclical heating-up of the exhaust gas stream by enriching the exhaust gas stream with non-combusted hydrocarbons. This occurs either by enriching the combustion mixture or introducing fuel ahead of the particle filter. Such an arrangement for regenerating the particle filter is on the one hand complicated and hence expensive, and on the other hand the cyclical regeneration of the particle filter disposed at the end of the arrangement again produces harmful materials that can no longer be removed from the exhaust gas. In addition, if particle filters are used they can become clogged with oil ash, so that such filters must be removed at certain intervals and must be cleaned.

A further combination of a particle filter and an arrangement for the selective catalytic reduction is known from EP 1 054 722 A1. The arrangement described therein comprises an oxidation catalytic converter that is disposed in the exhaust gas stream and that increases the proportion of nitrogen dioxide in the exhaust gas, a fine material filter disposed downstream thereof, a reservoir for the reduction liquid, as well as an injection device for the reduction fluid that is disposed behind the fine material filter, and additionally an SCR catalytic converter disposed downstream in the exhaust gas stream. Although the above-described arrangement permits a continuous conversion of the fine material particles of the carbon type accumulated in the fine material filter with the aid of the nitrogen dioxide produced In the oxidation catalytic converter, it has another very serious drawback. The particle filter causes a cooling of the exhaust gas, so that for example with the use of the presently commercially available reduction liquid designated AdBlue, the exhaust gas temperature, in particular after start-up of the internal combustion engine, or during operation of the internal combustion engine in a lower output range, is too low to produce ammonia without yielding problematic byproducts from the 33% aqueous urea solution.

In conjunction with the decomposition of urea ($(NH_2)_2CO$) into ammonia ($NH_3$), it is known that this occurs under optimum conditions (temperatures greater than 350° C.) in two stages; according to $$(NH_2)_2CO \rightarrow NH_3 + HNCO \quad (7)$$

there is first effected the thermolysis, or pyrolysis, i.e. the thermal decomposition of urea. Subsequently, according to $$HNCO + H_2O \rightarrow NH_3 + CO_2 \quad (8)$$

there is effected the hydrolysis, in other words, the catalytic conversion of isocyanic acid (HNCO) into ammonia ($NH_3$) and carbon dioxide ($CO_2$).

Since with the use of AdBlue the reduction agent is present in a form dissolved in water, this water must be evaporated prior to and during the actual pyrolysis and hydrolysis.

If the temperature present with the previous reaction according to (7) and (8) is less than 350° C., or is heated only slowly, it is known from DE 40 38 054 A1 that essentially solid, non-meltable cyanuric acid results from trimerization of the isocyanic acid formed according to (7) pursuant to $$3HNCO \underset{\text{>350° C.}}{\overset{\text{<350° C.}}{\rightleftarrows}} (HNCO)_3 \quad (9)$$

which leads to clogging of the following SCR catalytic converter. Remedial action can, as outlined in the aforementioned DE 40 38 054, be provided by guiding the exhaust gas stream that is laden with the reduction agent over a hydrolysis catalytic converter. The exhaust gas temperature from which a quantitative hydrolysis is possible can thus be depressed to 160° C. The construction and composition of an appropriate catalytic converter is also described in the aforementioned publication as are the construction and function of an SCR catalytic converter system that is equipped with a hydrolysis catalytic converter.

Proceeding from the previously described state of the art, it is an object of the present invention, while avoiding the drawbacks of the known arrangements, to provide an exhaust gas post treatment system that reduces not only the particle emission but also the nitrogen oxide emission and that on the one hand operates without special regeneration cycles for the particle separator or particle filter and on the other hand, at possibly all operating conditions, releases $NH_3$ from the reduction agent without the formation of problematic reaction products.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
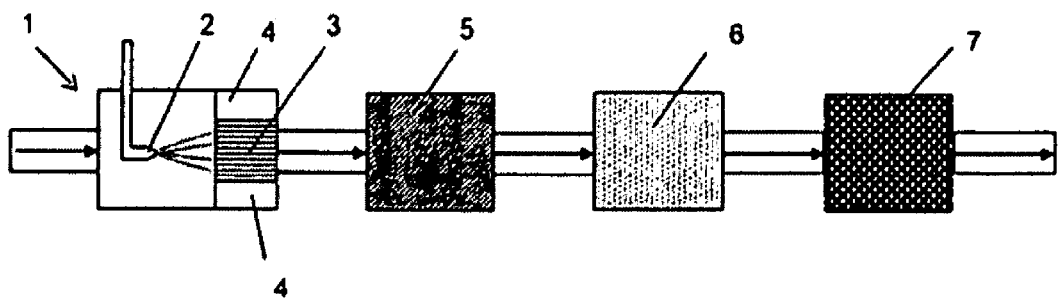
FIG. 1 shows a first exhaust gas post treatment system having partial stream hydrolysis.

Pursuant the present application, an exhaust gas post treatment system is provided for nitrogen oxide and particle reduction of an internal combustion engine operated with excess air, whereby the nitrogen oxide reduction is effected via an SCR catalytic converter and the particle reduction is effected via a particle separator or a particle filter, whereby an oxidation catalytic converter is disposed in the exhaust gas stream of the internal combustion engine and converts at least a portion of the nitric oxide contained in the exhaust gas stream into nitrogen dioxide, whereby a supply tank for a reduction agent and a metering device for the reduction agent are provided, whereby the metering device adds the reduction agent to the exhaust gas stream downstream of the oxidation catalytic converter and/or to a partial exhaust gas stream that is branched off from the exhaust gas stream upstream of the oxidation catalytic converter, extends parallel to the oxidation catalytic converter and is returned to the exhaust gas stream downstream of the oxidation catalytic converter, whereby the reduction agent is ammonia or a material that releases ammonia downstream of the supply location for the reduction agent as a result of the hot exhaust gas, whereby a particle separator or particle filter is disposed in the exhaust gas stream downstream of the oxidation catalytic converter and downstream of the supply location for the reduction agent, wherein the particle separator or particle filter converts carbon particles accumulated in the particle separator or particle filter into carbon monoxide, carbon dioxide, nitrogen and nitric oxide with the aid of the nitrogen dioxide contained in the exhaust gas stream, and whereby an SCR catalytic converter is disposed downstream of the particle separator or particle filter for reducing the nitrogen oxides contained in the exhaust gas stream into nitrogen and water vapor with the aid of the ammonia or released ammonia by way of selective catalytic reduction.

The realization of the object of the present application is based on achieving the required exhaust gas threshold values in that the nitrogen oxide reduction is effected by an SCR catalytic converter with the aid of ammonia, and the particle reduction is effected by means of a particle separator or a particle filter. The inventive exhaust gas post treatment system provides an oxidation catalytic converter in the exhaust gas stream of the internal combustion engine for converting at least a portion of the nitric oxide contained in the exhaust gas stream into nitrogen dioxide. To prevent undesired reaction products, such as cyanuric acid, it was found that an ammonia-releasing reduction agent must be supplied to the exhaust gas stream downstream of the oxidation catalytic converter or to a partial exhaust gas stream that is branched off from the exhaust gas stream upstream of the oxidation catalytic converter, extends parallel to the oxidation catalytic converter and is returned to the exhaust gas stream downstream of the oxidation catalytic converter in order to release ammonia ($NH_3$) from the reduction agent downstream of the supply location as a result of the hot exhaust gas. The supply of the reduction agent is thus effected as close to the engine as possible and still upstream of the particle separator or particle filter, thereby advantageously preventing a cooling off of the exhaust gas stream.

As an alternative to the ammonia-releasing reduction agent, $NH_3$ can also be supplied upstream of the particle separator, with such $NH_3$ being released at some other location from a reduction agent under appropriately favorable conditions.

Due to the fact that the particle separator or particle filter is disposed in the exhaust gas stream downstream of the oxidation catalytic converter, it is possible to continuously convert the accumulated carbon particles into carbon monoxide, carbon dioxide, nitrogen and nitric oxide with the aid of the nitrogen dioxide contained in the exhaust gas stream, so that a special cyclical regeneration of the particle separator or particle filter can advantageously be dispensed with. The reduction of the nitrogen oxides remaining in the exhaust gas stream to nitrogen and water vapor is advantageously effected by the downstream SCR system.

To improve the conversion of the reduction agent, in particular after the start of the internal combustion engine and in the low load range, it is advantageous to dispose a hydrolysis catalytic converter between the supply location and the particle separator or particle filter. In this connection, to advantageously minimize the structural size, the hydrolysis catalytic converter and the particle separator or particle filter can be combined in a single component by coating or impregnating the particle separator or particle filter at least partially with an active component that forms the hydrolysis catalytic converter.

It is similarly possible to combine the hydrolysis catalytic converter and the oxidation catalytic converter to form a common component by disposing both of them parallel to one another in a common housing and supplying the reduction agent to the partial exhaust gas stream, wherein the reduction agent flows only through the hydrolysis catalytic converter. The structural size can also advantageously be reduced by these measures.

With internal combustion engines that are supercharged by means of an exhaust gas turbocharger, it can be advantageous to branch off the partial exhaust gas stream, into which a reduction liquid is sprayed or otherwise introduced, upstream of the turbine of the exhaust gas turbocharger in order to provide as high a temperature level as possible for the release of the ammonia. If the turbine is a double-flow turbine, whereby one channel is supplied with exhaust gas from at least one first cylinder and the other channel is supplied with exhaust gas from at least one second cylinder, it is advantageous to branch the partial exhaust gas stream off from one of the two channels. The cylinders of the channel from which the partial exhaust gas stream is branched off can then be operated with other engine parameters than are the cylinders of the other channel, so that is it advantageously possible to optimize the conditions in the partial exhaust gas stream with regard to the preparation of the reduction agent by, for example, raising the exhaust gas temperature in the start-up phase or in the low load range.

If the internal combustion engine has two exhaust gas turbochargers, whereby the turbine of one of the turbochargers is supplied with exhaust gas from a first bank of cylinders of the internal combustion engine, and the turbine of the other exhaust gas turbocharger is supplied with exhaust gas from a second bank of cylinders of the internal combustion engine, it is advantageous if the partial exhaust gas stream is branched off from the exhaust gas stream upstream of the turbine of one of the two turbochargers. The cylinders of the bank of cylinders, from the exhaust gas section of which the partial exhaust gas stream is branched off, can then be operated with other engine parameters than are the cylinders of the other bank of cylinders. In this way, it is also here advantageously possible to optimize the condition in the partial exhaust gas stream with regard to the preparation of the reduction agent by, for example, raising the exhaust gas temperature in the start-up phase or in the low load range.

For the exact metering of the reduction agent, it can furthermore be advantageous to dispose a flow-control element in the partial exhaust gas stream for controlling the volume velocity and/or the quantity of the exhaust gas therein.

In order with internal combustion engines that are installed in vehicles during pushing operation or in engine braking operation to prevent the partial exhaust gas stream that is already laden with ammonia from flowing back in the direction of the internal combustion engine, it is advantageous to dispose a check valve upstream of the supply location in order in this way to protect the upstream components from the aggressive or corrosive ammonia. Alternatively, or addition thereto, it can be advantageous to use a controllable shutoff element, for example in the form of an exhaust gas valve, that is disposed upstream of the supply location in the partial exhaust gas stream and that if necessary blocks the partial exhaust gas stream. Such a controllable valve could also advantageously serve as a controllable or regulatable flow-control element, and could be controlled by the already present engine control unit.

It can furthermore be advantageous to dispose a catalytic converter for the oxidation of ammonia downstream of the SCR catalytic converter to prevent ammonia slippage.

Platinum and/or palladium and/or iridium and/or oxides thereof and/or $IrTiO_x$ and/or zeolites can advantageously be used as active material for the catalytic converter for the oxidation of NO to $NO_2$, as well as for the catalytic converter for the oxidation of ammonia. The SCR catalytic converters for the reduction of nitrogen oxides with the aid of ammonia can advantageously contain vanadium and/or vanadium pentoxide and/or titanium dioxide and/or tungsten oxide and/or copper-containing zeolites and/or iron-containing zeolites and/or cobalt-containing zeolites as active components. Titanium dioxide and/or silicon dioxide and/or aluminum oxide and/or zeolites can be used as active components for the hydrolysis catalytic converter for the release of ammonia.

The aforementioned catalytic converters can be complete catalytic converters and/or coated catalytic converters, whereby the active components of the catalytic converters can be applied to ceramic and/or metallic and/or silica-containing and/or quartz-containing substrates.

Since the exhaust gas temperature at the particle separator or particle filter, as well as the content of nitrogen dioxide at the particle separator or particle filter, can significantly influence the effectiveness of the exhaust gas post treatment system, it can be advantageous to vary the exhaust gas temperature and/or the content of nitrogen dioxide by varying the engine setting by means of the already present engine control unit. In particular, the exhaust gas temperature and the nitrogen dioxide content can be raised by varying the engine parameters or by supplying hydrocarbons to the exhaust gas stream upstream of the oxidation catalytic converter for the oxidation of nitric oxide (and/or of hydrocarbons and/or of carbon monoxide).

It is furthermore advantageous to combine a plurality of the catalytic converters contained in the exhaust gas post treatment system in a housing in order to minimize the cost for the system and in particular to minimize the space required for installation in, for example, commercial vehicles. Particle separators or particle filters are advantageously constructed in such a way that they can be removed or exchanged.

Further specific features of the present invention will be described in detail subsequently.

Description of Specific Embodiments

Referring now to the drawings in detail, an arrangement for the selective catalytic reduction and for the reduction of solid particles in the exhaust gas of an internal combustion engine is schematically illustrated in FIG. 1. The exhaust gases, which are produced from an internal combustion engine (not illustrated) by the combustion processes, and which are symbolized by arrows in FIG. 1, first pass into an exhaust gas preparation system 1, in which a reduction agent is added to the hot exhaust gas as close to the engine as possible. As is common with motor vehicles having SCR catalytic converters, the reduction agent is an aqueous urea solution; it is, of course, also conceivable to add urea in solid form, as this is already described in detail in the pertinent technical literature. It is furthermore possible to add ammonia as the reduction agent which is recovered at some other location, for example under more favorable thermal conditions, from a material that releases ammonia. The metering or dosing is effected as a function of the operating parameters of the internal combustion engine, controlled by an engine control unit (not illustrated), in such a way that via a nozzle 2, the aqueous urea solution is sprayed into the exhaust gas stream immediately upstream of a hydrolysis catalytic converter 3. The purpose of the hydrolysis catalytic converter 3 is to convert the aqueous urea solution as completely as possible into ammonia and water vapor while avoiding byproducts. Under certain conditions this release is also adequately effected without a hydrolysis catalytic converter, so that the latter can then be eliminated. Disposed parallel to the hydrolysis catalytic converter is an oxidation catalytic converter, the object of which, according to the reaction previously identified by (2), is to oxidize a portion of the nitric oxide contained in the exhaust gas to nitrogen dioxide by means of the excess oxygen present in the exhaust gas. The thus-produced nitrogen dioxide is used on the one hand during the reduction of the solid particles, and on the other hand with the subsequent SCR reaction, as will be described in greater detail subsequently.

Disposed downstream of the hydrolysis catalytic converter 3, and of the oxidation catalytic converter 4 disposed parallel thereto, is a particle separator that accumulates the carbon particles found in the exhaust gas. The carbon particles thus retained in the particle separator 5 are continuously converted to carbon monoxide, carbon dioxide, nitrogen, and nitric oxide by the nitrogen dioxide produced upstream with the aid of the oxidation catalytic converter 4, thus eliminating expensive regeneration cycles for the particle separator 5.

The actual selective catalytic reduction of the nitrogen oxides is effected in an SCR catalytic converter 6 that is disposed downstream of the particle separator 5 and that is intended to convert as great a portion as possible of the nitrogen oxides ($NO_x$) present in the exhaust gas, with a simultaneously high selectivity of the reduction, into nitrogen and water vapor, without excess ammonia ($NH_3$) remaining in the exhaust gas stream. With the indicated SCR reduction reaction, the residual nitrogen dioxide possibly still present in the exhaust gas stream is more reactive than is the remaining NO in the exhaust gas, so that it is desirable to design the oxidation catalytic converter in such a way that as great a proportion of nitric oxide as possible is converted into nitrogen dioxide, In other words, if possible, more than is required for the conversion of the carbon particles in the particle separator.

Due to the highly exothermic carbon oxidation, a significant temperature increase can occur, so that downstream of the particle separator temperatures above 650° C. can readily occur that lead to damage of $V_2O_5$-containing SCR catalytic converters. For this reason, the use of SCR catalytic converters that are free of $V_2O_5$, which are general based on iron, cobalt, or copper zeolite material, can be expedient.

In view of the constantly changing operating conditions of an internal combustion engine that operates in a motor vehicle, it is obvious that the desired, as high as possible, conversion rates of nitrogen oxides can reliably take place only if a slight ammonia excess is accepted. In order in situations of insufficient conversion to prevent toxic ammonia from being given off to the atmospheric air along with the partially cleaned exhaust gas, disposed downstream of the SCR catalytic converter 6 is an $NH_3$-oxidation catalytic converter 7, via which the excess $NH_3$ is converted into nitrogen and water vapor. This oxidation reaction should take place as selectively as possible, so that at least portions of iridium or iridium oxide should be used as active material for the $NH_3$-oxidation catalytic converter 7. If, however, a high conversion with low selectivity is desired, platinum and/or palladium and/or oxides thereof can be used as active material.

As indicated previously, if the temperature level at the supply location for the reduction agent is high over the entire operating range, the hydrolysis catalytic converter 3 can be eliminated. Furthermore, as an alternative to the example of FIG. 1, a particle filter can be used in place of the particle separator, with the difference between particle separators and particle filters being explained previously. The exchangeability of particle separators and particle filters also applies to the examples that follow, even without an explicit reference thereto.

Figure 2:
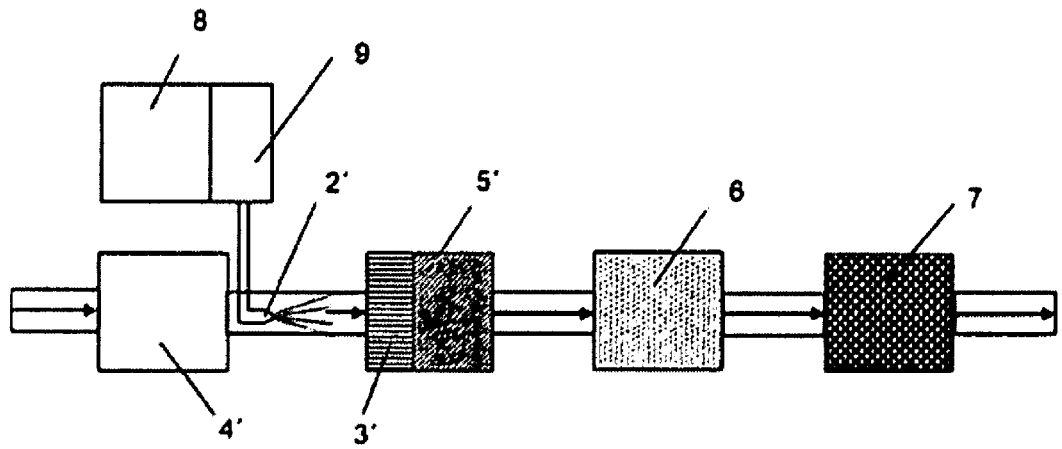
FIG. 2 shows an exhaust gas post treatment system having main stream hydrolysis.

FIG. 2 shows an embodiment that is simplified from the embodiment of FIG. 1. Here a parallel guidance of the exhaust gas stream, which is also indicated by arrows in this example, is dispensed with, so that the supply location for the reduction agent is disposed downstream of the oxidation catalytic converter 4', which is disposed in the exhaust gas stream and that converts a portion of the nitric oxide contained in the exhaust gas stream into nitrogen dioxide. The supply of the reduction agent, in this example aqueous urea solution (AdBlue), is effected by a metering device 9, which is controlled as a function of operating parameters of the internal combustion engine and withdraws the aqueous urea solution from a supply tank 8 and sprays specified quantities thereof into the exhaust gas stream via the nozzle 2', depending upon the operating state of the internal combustion engine. Disposed downstream of the supply location in the exhaust gas stream is a particle filter 5', the upstream portion of which is coated with an active component that facilitates the hydrolysis of the reduction agent. Active components that can be used for this purpose were already described in conjunction with FIG. 1. In addition to the hydrolysis of the reduction agent, in the particle separator the accumulated carbon particles are, as previously described, continuously converted into carbon monoxide, carbon dioxide, nitrogen and nitric oxide by means of the nitrogen dioxide formed in the oxidation catalytic converter 4'. The reduction of the nitrogen dioxides is effected in the SCR catalytic converter 6 that is disposed downstream of the particle separator, and which is followed by the $NH_3$-oxidation catalytic converter 7. The functions of the SCR catalytic converter 6 and the $NH_3$-oxidation catalytic converter 7 are identical to those described in the example of FIG. 1, so that further explanations are unnecessary and reference can be made to the indicated passages above.

Figure 3:
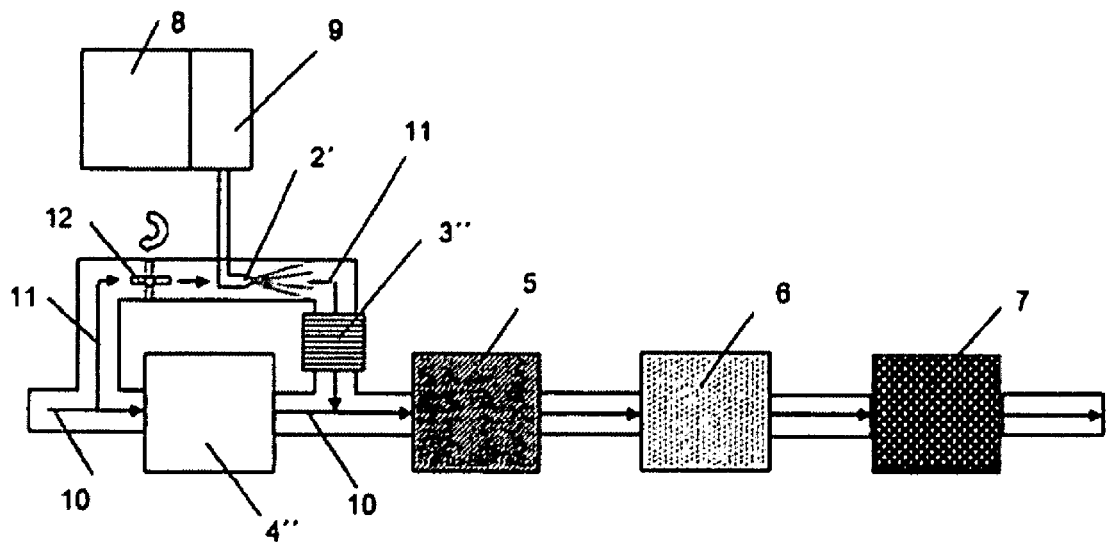
FIG. 3 shows a second exhaust gas post treatment system having partial stream hydrolysis.

FIG. 3 shows a further embodiment of the inventive exhaust gas post treatment system. Since this example differs from the example of FIG. 1 only in the preparation of the reduction agent, only those parts that differ will be described subsequently, and for the same parts reference can be had to the description of the example of FIG. 1.

Upstream of an oxidation catalytic converter 4' that is disposed in the main exhaust gas stream 10, and that oxidizes nitric oxide to nitrogen dioxide, a partial exhaust gas stream 11 branches off from the main exhaust gas stream 10 and is guided over a shutoff device 12 that can be controlled by an engine control unit (not illustrated) as a function of operating parameters of the internal combustion engine. The task of the shutoff device 12 is on the one hand to control volume flow and exhaust gas quantity in the partial exhaust gas stream 11 as a function of the operating condition of the internal combustion engine, and on the other hand, at certain operating conditions, for example during engine braking operation of an internal combustion engine installed in a commercial vehicle, to prevent exhaust gases that are laden with ammonia from flowing back in the direction of the engine. Disposed downstream of the shutoff device 12 is a metering device for the reduction agent that is identical to that described with regard to FIG. 2. To avoid repetition, reference is made to the pertaining passages of the description of FIG. 2.

Again disposed downstream of the supply location for the reduction agent is a hydrolysis catalytic converter 3" that ensures the release of ammonia from the reduction agent, even at unfavorable temperature conditions. Downstream of the oxidation catalytic converter 4" the partial exhaust gas stream 11 again opens out into the main exhaust gas stream 10 and, together therewith, is supplied to the particle separator 5, the SCR catalytic converter 6, and the $NH_3$-oxidation catalytic converter 7, the function of which has already been explained in conjunction with FIG. 1. For this purpose, references is made to the description of FIG. 1.

Figure 4:
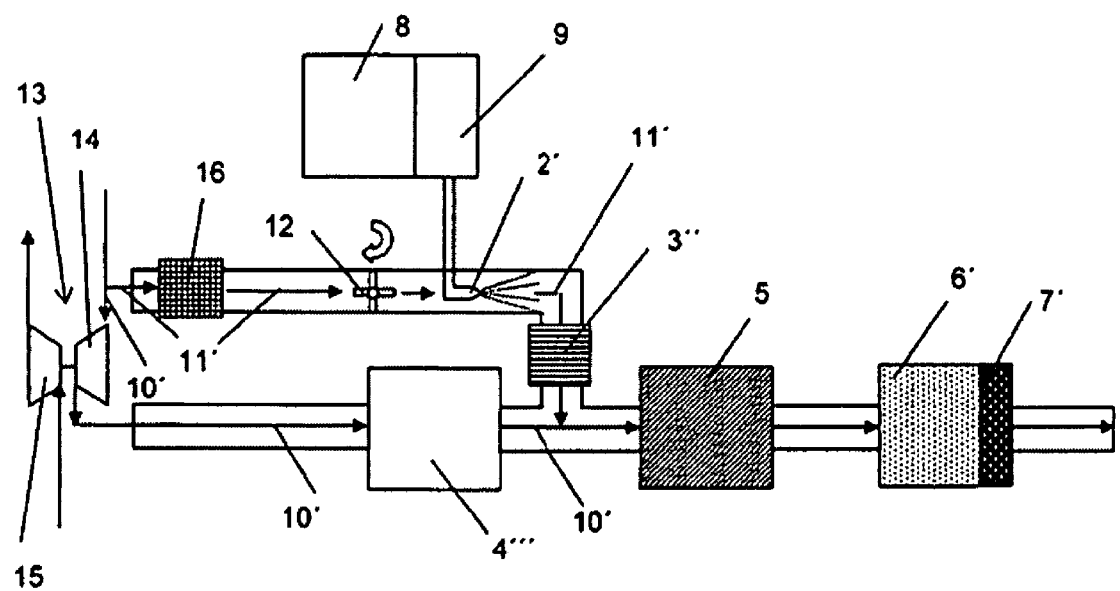
FIG. 4 shows an exhaust gas post treatment system for internal combustion engines having turbochargers.

With internal combustion engines operated these days in commercial vehicles, an at least single-stage turbocharger arrangement is customarily provided, which with the aid of the exhaust gas enthalpy contained in the exhaust gas stream compresses the combustion air supplied to the internal combustion engine. For the exhaust gas post treatment this causes problems because the exhaust gas that flows over the turbines of the exhaust gas turbocharger or turbochargers is inherently significantly cooled off by them. An exhaust gas stream that is cooled off in this manner is, in particular during a start-up operation and in the lower partial load range, not in a position to achieve exhaust gas temperatures that are adequate for the hydrolysis of the reduction agent. Even if hydrolysis catalytic converters are used, the temperature is frequently not adequate. The arrangement of FIG. 4 provides relief for this problem. As shown there, the exhaust gas stream coming from the internal combustion engine (not illustrated) already branches off upstream of the turbine 14 of the exhaust gas turbocharger 13 into a main exhaust gas stream 10', which is guided over the turbine 14 and drives the compressor 15 thereby, and into a partial exhaust gas stream 11'. The partial exhaust gas stream 11' is guided over an oxidation catalytic converter 16, which on the one hand in the normal direction of flow of the exhaust gas indicated by the arrows converts nitric oxide into nitrogen dioxide, and on the other hand, for example during engine braking operation, oxidizes ammonia or not yet converted reduction agent that possibly flows back with the exhaust gas stream in the direction of the internal combustion engine. Disposed downstream of the oxidation catalytic converter 16 in the partial exhaust gas stream 11' is a shutoff device 12, the construction and function of which correspond to that of the shutoff device described in conjunction with FIG. 3; for this purpose, reference is made to the detailed description of FIG. 3. Downstream of the shutoff device 12, the reduction agent is supplied to the partial exhaust gas stream 11' via a metering device as already described in FIG. 2. By means of the relatively high exhaust gas temperature that exists in the partial exhaust gas stream, and by means of the hydrolysis catalytic converter that is disposed downstream of the supply location, the reduction agent releases ammonia without the production of problematic reaction products, such as cyanuric acid. Parallel to the partial exhaust gas stream 11', the main exhaust gas stream 10' is guided over the oxidation catalytic converter 4''', that in turn oxidizes nitric oxide contained in the exhaust gas to nitrogen dioxide. Downstream of the oxidation catalytic converter 4''' in the main exhaust gas stream 10', and downstream of the hydrolysis catalytic converter 3" in the partial exhaust gas stream 11', the two exhaust gas streams that are guided parallel to one another are again joined and flow through the downstream particle separator 5 where, as already explained in conjunction with the other embodiments, the carbon particles accumulated in the particle separator are continuously converted with the aid of the nitrogen dioxide produced in the oxidation catalytic converters 4''' and 16 to carbon monoxide, carbon dioxide, nitrogen and nitric oxide. Disposed downstream of the particle separator 5 is an SCR catalytic converter 6' that, by way of selective catalytic reduction, converts the nitrogen oxides present in the exhaust gas to nitrogen and water vapor. To avoid ammonia slippage, the downstream portion of the SCR catalytic converter 6' is coated with an active material that forms an $NH_3$-catalytic converter 7'.

If, as an alternative to the example of FIG. 4, the turbine 14 is a double-flow turbine, whereby one channel is supplied with exhaust gas from a first number of cylinders and the other channel is supplied with exhaust gas from a second number of cylinders, it is advantageous to branch the partial exhaust gas stream off from one of the two channels. The cylinders of the channel from which the partial exhaust gas stream is branched off can then be operated with other engine parameters (e.g. fuel injection times or quantities) than are the cylinders of the other channel, so that it is advantageously possible to optimize the conditions in the partial exhaust gas stream with regard to the preparation of the reduction agent by, for example, raising the exhaust gas temperature in the start-up phase or in the low load range, for example by a secondary injection in the expansion or exhaust stroke.

With internal combustion engines having two banks of cylinders, where each of the banks of cylinders customarily has its own exhaust gas turbocharger, so that the turbine of one of the turbochargers is supplied with exhaust gas from one bank of cylinders of the internal combustion engine and the turbines of the other turbocharger are supplied with exhaust gas from the other bank of cylinders of the internal combustion engine, it is advantageous to branch the partial exhaust gas stream off from the exhaust gas stream upstream of the turbine of one of the two exhaust gas turbochargers. The cylinders of the bank of cylinders, from the exhaust gas section of which the partial exhaust gas stream is branched off, can then be operated with other engine parameters (e.g. fuel injection time or quantities) than are the cylinders of the other bank of cylinders, so that here also it is advantageously possible to optimize the conditions in the partial exhaust gas stream with regard to preparation of the reduction agent by, for example, raising the exhaust gas temperature in the start-up phase or in the low load range, for example by a secondary injection in the expansion or exhaust stroke.

With regard to the catalytic converters mentioned in the preceding examples, it is noted that they are complete catalytic converters and/or coated catalytic converters where the active components of the catalytic converters can be applied to ceramic and/or metallic and/or silica-containing and/or quartz-containing substrates. Such catalytic converters can be produced with the aid of many known manufacturing processes; for this purpose, details can be found in the pertinent technical literature.

For the oxidation catalytic converters mentioned in the preceding examples, platinum and/or palladium and/or iridium and/or oxides thereof and/or $IrTiO_x$ and/or zeolites can be used as active materials. Vanadium and/or vanadium pentoxide and/or titanium dioxide and/or tungsten oxide and/or copper-containing zeolites and/or iron-containing zeolites and/or cobalt-containing zeolites can be used as active components for the SCR catalytic converters for the reduction of nitrogen oxides with the aid of ammonia. For the hydrolysis catalytic converter, for the improvement of the release of ammonia, titanium dioxide and/or silicon dioxide and/or aluminum oxide and/or zeolites can be used as active components.

It can furthermore be expedient to accommodate a plurality of catalytic converters and/or particle separators in a common housing in order to save space and to reduce cost.

Since with the use of particle filters a clogging of the filters with oil ash can occur, it is expedient to construct the filters in such a way that they can be exchanged or removed and hence easily cleaned.

To operate the exhaust gas post treatment system in its optimum operating range, the exhaust gas temperature and/or the content of nitrogen dioxide at the devices for separating particles can be varied by adjustment of engine parameters and/or by raising the hydrocarbon concentration with the aid of an adjustment of engine parameters and/or by supplying hydrocarbons to the exhaust gas stream upstream of the catalytic converters for the oxidation of nitric oxide and/or hydrocarbons and/or carbon monoxide.

The previously described embodiments can, of course, be realized in many ways by one of skill in the art without straying from the basic inventive concept; thus, the embodiments described are provided by way of example only.

The specification incorporates by reference the disclosure of Germany priority document DE 10 2006 038 290.0 filed 16 Aug. 2006.

The present invention is, of course, in no way restricted to the specific disclosure of the specification and drawings, but also encompasses any modifications within the scope of the appended claims.

We claim:

1. An exhaust gas post treatment system for nitrogen oxide and particle reduction of an internal combustion engine operated with excess air, comprising:

an oxidation catalytic converter disposed in the exhaust gas stream of the internal combustion engine for converting at least a portion of the nitric oxide contained in the exhaust gas stream into nitrogen dioxide;

a supply tank for a reduction agent;

a metering device for receiving the reduction agent from the supply tank and for adding the reduction agent to at least one of the group consisting of the exhaust gas stream at a supply location downstream of said oxidation catalytic converter, and a partial exhaust gas stream that is branched off from the exhaust gas stream upstream of the oxidation catalytic converter, extends parallel to said oxidation catalytic converter and is returned to the exhaust gas stream downstream of said oxidation catalytic converter, wherein the reduction agent is ammonia or a material that is adapted to release ammonia downstream of said supply location for reduction agent as a result of the hot exhaust gas;

a particle separator or particle filter disposed in the exhaust gas stream downstream of said oxidation catalytic converter and downstream of said supply location for reduction agent, wherein said particle separator or particle filter is adapted to convert carbon particles accumulated in said particle separator or particle filter into carbon monoxide, carbon dioxide, nitrogen and nitric oxide with the aid of nitrogen dioxide contained in the exhaust gas stream; and an SCR catalytic converter disposed downstream of said particle separator or particle filter for reducing nitrogen oxides contained in the exhaust gas stream to nitrogen and water vapor with the aid of ammonia or released ammonia by way of selective catalytic reduction.

2. An exhaust gas post treatment system according to claim 1, wherein a hydrolysis catalytic converter is disposed between said supply location for the reduction agent and said particle separator or particle filter for improvement of release of ammonia.

3. An exhaust gas post treatment system according to claim 2, wherein said hydrolysis catalytic converter and said particle separator or particle filter are combined in a single component by coating or impregnation of said particle separator or particle filter at least partially with an active component that forms said hydrolysis catalytic converter.

4. An exhaust gas post treatment system according to claim 2, wherein said hydrolysis catalytic converter and said oxidation catalytic converter form a common component by arrangement of both components parallel to one another in a common housing, further wherein one portion of said exhaust gas stream is adapted to flow only through said hydrolysis catalytic converter, further wherein another portion of said exhaust gas stream is adapted to flow only through said oxidation catalytic converter, and wherein the reduction agent is added to the partial exhaust gas stream and is adapted to flow only through said hydrolysis catalytic converter.

5. An exhaust gas post treatment system according to claim 1, wherein at least one turbine of at least one exhaust gas turbocharger is disposed upstream of said oxidation catalytic converter, and wherein said branching off of said partial exhaust gas stream, into which the reduction agent is supplied, is disposed upstream of said turbine of said exhaust gas turbocharger.

6. An exhaust gas post treatment system according to claim 5, wherein said turbine is a double-flow turbine, further wherein one channel thereof is supplied with exhaust gas from at least a first cylinder of the engine and the other channel thereof is supplied with exhaust gas from at least one second cylinder of the engine, and wherein said partial exhaust gas stream is branched off from one of said two channels.

7. An exhaust gas post treatment system according to claim 6, wherein the cylinders of the channel from which the partial exhaust gas stream is branched off is adapted to be operated with other engine parameters than are the cylinders of the other channel.

8. An exhaust gas post treatment system according to claim 5, wherein two exhaust gas turbochargers are provided, further wherein the turbine of one of said turbochargers is supplied with exhaust gas from a first bank of cylinders of the internal combustion engine and the turbine of the other turbocharger is supplied with exhaust gas from a second bank of cylinders of the internal combustion engine, and wherein the partial exhaust gas stream is branched off from the exhaust gas stream upstream of the turbine of one of the two exhaust gas turbochargers.

9. An exhaust gas post treatment system according to claim 8, in which that bank of cylinders, from the exhaust gas section of which the partial exhaust gas stream is branched off, is adapted to be operated with other engine parameters than is the other bank of cylinders.

10. An exhaust gas post treatment system according to claim 1, wherein a flow-control element is disposed in the partial exhaust gas stream for controlling or regulating at least one of a volume velocity and a quantity of the exhaust gas therein.

11. An exhaust gas post treatment system according to claim 1, wherein a check valve is disposed in the partial exhaust gas stream upstream of the supply location for the reduction agent.

12. An exhaust gas post treatment system according to claim 1, wherein a controllable or regulatable shutoff element is disposed in the partial exhaust gas stream upstream of the supply location for the reduction agent.

13. An exhaust gas post treatment system according to claim 1, wherein an $NH_3$-oxidation catalytic converter is disposed downstream of said SCR catalytic converter.

14. An exhaust gas post treatment system according to claim 13, wherein at least one of the materials selected from the group consisting of platinum, palladium, iridium, oxides thereof, $IrTiO_x$ and zeolites are adapted to be used as active components for said oxidation catalytic converter for conversion of nitric oxide into nitrogen dioxide and/or for said $NH_3$-oxidation catalytic converter for oxidation of ammonia.

15. An exhaust gas post treatment system according to claim 1, wherein said SCR catalytic converter for the reduction of nitrogen oxides with the aid of ammonia contains at least one of the materials selected from the group consisting of vanadium, vanadium pentoxide, titanium dioxide, tungsten oxide, copper containing zeolites, iron-containing zeolites, and cobalt-containing zeolites as active components.

16. An exhaust gas post treatment system according to claim 2, wherein said hydrolysis catalytic converter for the release of ammonia contains at least one of the materials selected from the group consisting of titanium dioxide, silicon dioxide, aluminum oxide and zeolites as active components.

17. An exhaust gas post treatment system according to claim 1, wherein at least one of the exhaust gas temperature and the content of nitrogen dioxide at said particle separator or particle filter is adapted to be varied by at least one of an adjustment of engine parameters and by a raising of a hydrocarbon concentration with the aid of at least one of an adjustment of engine parameters and by a supply of hydrocarbons into the exhaust gas stream upstream of said oxidation catalytic converter for the oxidation of nitric oxide.

18. An exhaust gas post treatment system according to claim 1, wherein a plurality of catalytic converters and/or particle separators are disposed in a common housing.

19. An exhaust gas post treatment system according to claim 1, wherein said particle separator or particle filter is constructed in such a way that it is adapted to be exchanged or removed.

* * * * *